Figure 4:
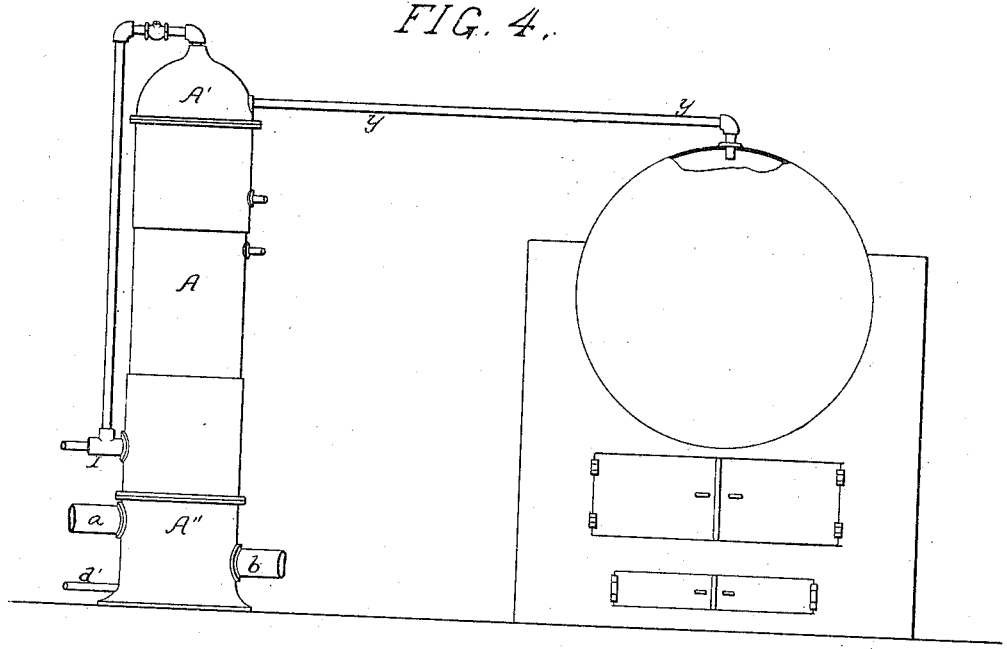

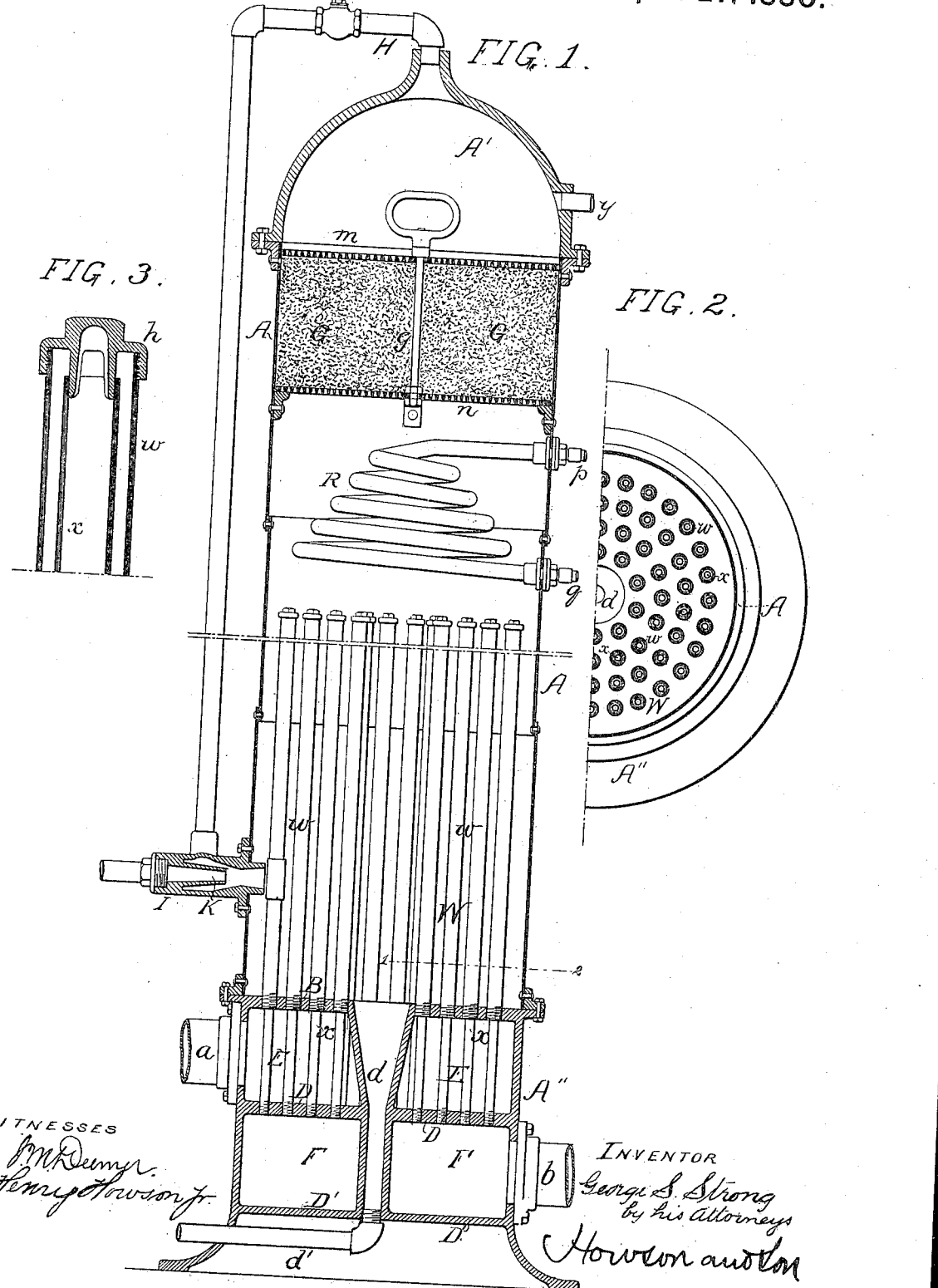

G. S. STRONG.
Feed-Water Heater.

No. 227,072.

2 Sheets—Sheet 2.

Patented April 27, 1880.

UNITED STATES PATENT OFFICE.

GEORGE S. STRONG, OF PHILADELPHIA, PENNSYLVANIA.

FEED-WATER HEATER.

SPECIFICATION forming part of Letters Patent No. 227,072, dated April 27, 1880.

Application filed February 19, 1880.

*To all whom it may concern:*

Be it known that I, GEORGE S. STRONG, a citizen of the United States, residing in Philadelphia, Pennsylvania, have invented an Improved Feed-Water Heater, of which the following is a specification.

My invention relates to certain improvements in the feed-water heater for which Letters Patent were allowed to me December 24, 1879; and my improvement consists in interposing between the filter described in said application and the tops of the tubes, which are heated by exhaust-steam, a live-steam heater, for the purpose of imparting a high degree of heat to the water before it reaches the filter.

My invention further consists of a certain combination of heater and filter, steam-boiler, and feed-pipe, whereby live steam may be blown through the heater at intervals in order to clean the filter.

In the accompanying drawings, Figure 1, Sheet 1, is a vertical section of my improved heater; Fig. 2, a sectional plan of part of the heater on the line 1 2; Fig. 3, a vertical section of the upper portion of one of the heating-tubes; and Fig. 4, Sheet 2, a diagram illustrating one of the features of my invention.

A is the cylindrical shell or casing of the heater, and to the upper end of this casing is secured the detachable cover A', the lower end being secured to the base, to the peculiar construction of which one of my improvements relates. The base consists of a hollow cylinder, A'', made flaring at the bottom, the three partitions, B, D, and D', and the central tube, d, the whole being cast in one piece.

In my former heater, above referred to, the plate-iron casing was carried downward and secured to a base-plate, the top of which formed the partition D', the partitions B and D being separate plates secured to the interior of the casing, and the central tube being fitted to openings in the latter partitions—a very expensive mode of construction compared with that adopted in the present instance, in which the whole of the partitions, the cylinder A'', and the central tube, cast in one piece, form a substantial base for the entire structure and inclose the inlet-chamber E and outlet-chamber F.

Exhaust-steam is admitted to chamber E through the pipe $a$, and after taking the course described hereinafter is discharged from the chamber F through the pipe $b$, as in my former heater.

The central tube, $d$, constitutes the blow-off passage, which extends through the whole of the partitions in the base, and forms a communication between the heating-chamber W and the blow-off pipe $d'$, this passage and pipe having no communication with either of the chambers E or F.

At the upper portion of the casing or shell of the heater is a mass, G, of filtering material—charcoal, for instance—which is confined between the upper perforated plate, $m$, and lower perforated plate, $n$, the latter resting on a ledge in the interior of the casing.

A central rod, $g$, passes through both plates and through the filtering material, and has at the upper end an eye, to which, after the cover A' has been removed, suitable hoisting-tackle may be attached when the perforated plates have to be removed from the casing A with the filtering material, for the purpose of cleansing or renewing the latter.

The mass of filtering material and the two perforated plates are the same as in my former heater, in which, however, the filter was situated at a distance below the upper end of the casing, whereas in my present improvement it is situated at the upper end of the casing, immediately below the cover, for a purpose rendered apparent hereinafter.

A series of vertical tubes, $w$, pass through and are secured to the partition B of the base and communicate with the chamber E, and each of these tubes contains a smaller tube, $x$, the lower end of which is secured to the partition D and communicates with the chamber F.

The manner in which each external tube, $w$, is closed at the top and made to communicate with its internal tube is shown in Fig. 3, where $h$ represents a cap screwed onto the external tube, and having a central tubular projection fitted into the internal tube and slotted or perforated at intervals, so as to form communications between the two tubes.

In my former heater the tubes passed through the plates $m$ and $n$ and through the filtering material; but in my present improvement there is a space within the casing, between the lower perforated plate of the filter and the tops of the tubes, and in this space is the coil R, to which live steam is admitted at $p$ and permitted to escape at $q$. This is an important feature of my invention, for the steam-heated coil increases the temperature of the water below the filter, and thereby reduces the water to the best condition for yielding to the action of the filtering medium.

The exhaust-steam admitted to the chamber E must pass upward through the annular space between each outer tube and inner tube, and return through the latter, before it can reach the outlet-chamber F, and hence a temperature nearly equal to that of the exhaust-steam must be imparted to the water in the heater.

A pipe, H, extends from the upper end of the cover A' to the chest I of an injector, feed-water under pressure being discharged into this chest through a nozzle, K, and thence, through the throat of the injector, into the heater at a point a short distance above the partition B. The effect of this is twofold: first, the introduction of the desired feed-water into the heater, and, second, an induced circulation of water from the top of the heater to the bottom of the heating-chamber W. This circulating-pipe and injector and their functions are described in my former application, in which is also described the heating of the water by contact with the tubes before it reaches the filter, in order that foreign matter held in suspension by the water may be disintegrated by the heat before it reaches the filter.

I have found in practice that better results, as far as the effective filtering of the water is concerned, can be attained by interposing between the filter and the tops of the tubes a steam-heater, which may consist of the coil shown; or the heater may be otherwise constructed, providing it does not materially interfere with the ascent of the water in the heater, and providing it increases the temperature of the water beyond that which the said water acquires by contact with the tubes.

The pipe $y$, which serves to convey the hot water from the heater to the boiler, terminates in the steam-space of the latter, as shown in Fig. 4, and the passage through said pipe is unobstructed by check-valves, so that when it is desired to clean the filter G of the heater the valve of the blow-off pipe $d'$ is opened, and live steam allowed to pass from the boiler through the pipe $y$ and into and through the heater, whereby the filter G is more effectually cleansed than by causing a backward flow of water through the same, as usual.

I claim as my invention—

1. The combination, in a feed-water heater, of a system of pipes heated by exhaust-steam, a filter, and a live-steam heater interposed between the said pipes and filter, all substantially as set forth.

2. The combination, in a feed-water heater, of the outer shell or casing, A, and the external and internal tubes with a base cast in one piece and inclosing the inlet-chamber E and outlet-chamber F, substantially as described.

3. The combination of a steam-boiler, a feed-water heater having a filter, a valved blow-off pipe, and a pipe, $y$, affording communication between the interior of the heater and the steam-space of the boiler, whereby live steam may be caused to flow backward through the filter for cleansing the latter, as set forth.

In testimony whereof I have signed my name to this specification in the presence of two subscribing witnesses.

GEO. S. STRONG.

Witnesses:
JAMES F. TOBIN,
HARRY SMITH.